United States Patent [19]

Marumoto et al.

[11] Patent Number: 4,865,148
[45] Date of Patent: Sep. 12, 1989

[54] VEHICLE HEIGHT CONTROL APPARATUS RESPONSIVE TO POWER STEERING OPERATION

[75] Inventors: Katsuji Marumoto; Kazuo Tahara, both of Hitachi; Hisatugu Ishikura, Katsuta; Hirohisa Yamamura, Hitachiota; Toru Tatsuzaki, Hiratsuka; Toshimi Abukawa, Hitachiota; Toshiyuki Koterazawa, Hitachi; Mitsuyuki Honbu, Katsuta; Tadashi Takahashi, Hitachi; Shuichi Takamatsu, Hitachi; Tsutomu Ohmae, Hitachi, all of Japan

[73] Assignees: Hitachi, Ltd.; Hitachi Automotive Engineer Co., Ltd., both of Tokyo, Japan

[21] Appl. No.: 230,056

[22] Filed: Aug. 9, 1988

[30] Foreign Application Priority Data

Aug. 14, 1987 [JP] Japan .................................. 62-201704

[51] Int. Cl.4 ........................................... B60G 17/08
[52] U.S. Cl. .................................... 180/141; 180/79.1;
280/707; 280/714
[58] Field of Search .............. 180/141, 142, 143, 79.1;
280/707, 708, 714

[56] References Cited

U.S. PATENT DOCUMENTS

| 4,566,718 | 1/1986 | Kanoi et al. | 280/708 |
| 4,573,705 | 3/1986 | Kanoi et al. | 280/708 |
| 4,577,716 | 3/1986 | Norton | 180/79.1 |
| 4,753,308 | 1/1988 | Noto et al. | 180/141 |

FOREIGN PATENT DOCUMENTS

| 0076760 | 6/1980 | Japan | 180/141 |
| 0073312 | 4/1984 | Japan | 280/707 |
| 0120509 | 7/1984 | Japan | 280/707 |
| 0215166 | 9/1986 | Japan | 180/141 |
| 0166105 | 7/1987 | Japan | 280/707 |

Primary Examiner—David M. Mitchell
Attorney, Agent, or Firm—Antonelli, Terry & Wands

[57] ABSTRACT

A vehicle height control apparatus responsive to power steering operation is disclosed in which a torque signal indicative of the steering torque imparted to the steering wheel by a driver's operation thereof is used for controlling the power steering system and also for controlling the operation of actuators for adjusting damping force of shock absorber provided to each wheel thereby controlling the height of the vehicle.

6 Claims, 5 Drawing Sheets

VEHICLE HEIGHT CONTROL APPARATUS RESPONSIVE TO POWER STEERING OPERATION

BACKGROUND OF THE INVENTION

The present invention relates to a vehicle height control apparatus responsive to power steering operation and more particularly to a control apparatus well suited for controlling the height of a vehicle through suspensions provided with variable damping force-type shock absorbers.

Automobile power steering systems, particularly electrically-operated power steering system of the type in which the steering operation by a driver is assisted by use of an electric motor, is disclosed for example in Japanese patent unexamined publication Nos. JP-A-55-76760 and JP-A-61-215166. On the other hand, there are disclosed for example in Japanese Patent Publication Nos. 62-9448 and 62-9449 methods for controlling the height of the body of an automotive vehicle during its straight or corner driving.

With these conventional techniques, the power steering and the vehicle height control are independently controlled and each of these controls requires sensors such as a torque sensor and a vehicle speed sensor. Further, in the vehicle height control in which means is provided for changing the damping force of the shock absorbers to control the incline of the vehicle body, since the moving angle of the steering wheel is detected to use it as a command for varying the damping force of the shock absorbers, it involves disadvantages in that the vehicle body goes down or dives rapidly during the period of cornering and also the restoration of the vehicle body position is delayed after returning to the straight driving thus deteriorating the steering stability and that the response to the continuous steering is slow and so on.

Also, with the vehicle height control, it is conceivable to use a method in which the incline of the vehicle body is detected by using a G sensor generally used for detecting an acceleration of the vehicle to control the position of the body. This method, however, has a disadvantage that it is hardly put to practical use due to the high cost of the G sensor.

Further, U.S. Pat. No. 4,577,716 discloses a system in which the steering force by a driver is assisted by use of a servo motor.

However, none of the prior arts discloses a vehicle height control apparatus co-operating with a power steering apparatus.

Although U.S. Pat. No. 4,566,718 discloses a technique of controlling the suspensions to adjust the height of a vehicle, it does not disclose a technique of controlling the damping force of the suspensions in response to the steering torque.

SUMMARY OF THE INVENTION

It is an object of the present invention to provide a vehicle height control apparatus responsive to power steering operation which uses a steering torque sensor and a vehicle speed sensor in common for the power steering control and the vehicle height control and is simple in system construction.

It is another object of the invention to provide a vehicle height control apparatus responsive to power steering operation which is excellent in response and steering performance.

The above objects are accomplished according to the present invention in which the vehicle height is controlled by using an output signal of a torque sensor, which is generally used, together with a steering angle sensor and a vehicle speed sensor, for the power steering control in contrast to the conventional vehicle height control in which a steering moving angle sensor is required for obtaining a signal used for the vehicle height control.

The electrically-operated power steering system of an automotive vehicle is designed so that the twisting torque of the steering wheel produced when operated by a driver is detected by a torque sensor and a motor is driven according to the detected twisting torque to move the steering mechanism in the same direction as the turning of the wheel, thereby providing steering assistance to improve the steering performance of the steering wheel.

On the other hand, the vehicle height control is also responsive to a torque signal so that if, for example, the steering wheel is turned to the right, the damping force of the left-side shock absorbers of the suspension is increased for stiffening the left-side. Also, when the steering wheel is turned to the left, the damping force of the right-side shock absorbers is increased to suppress the diving at the right-side of the vehicle body.

In this case, if the curve is sharp, the steering wheel torque signal becomes larger in magnitude and the damping force of the shock absorbers is increased at a side of the body outward of the curve, thereby reducing the outward diving of the vehicle body. Further, when the steering wheel is returned at the end portion of the curve with the driver's steering force being decreased, the magnitude of the torque signal is decreased rapidly (or to zero), thereby immediately restoring the damping force of the shock absorbers. Thus, with the vehicle height control operation during the steering wheel turning, the variable control of the shock absorber damping force can respond rapidly at any time when the damping force is to be increased or decreased due to the use of the steering torque signal of the steering wheel as compared with the steering wheel steering angle method.

In accordance with the invention, a vehicle height control apparatus is provided to be responsive to power steering operation which is excellent in vehicle height control response, stability and steering performance despite its simple system.

DETAILED DESCRIPTION OF THE PREFERRED EMBODIMENTS

An embodiment of the invention will now be described with reference to FIGS. 1 to 7.

Figure 1:
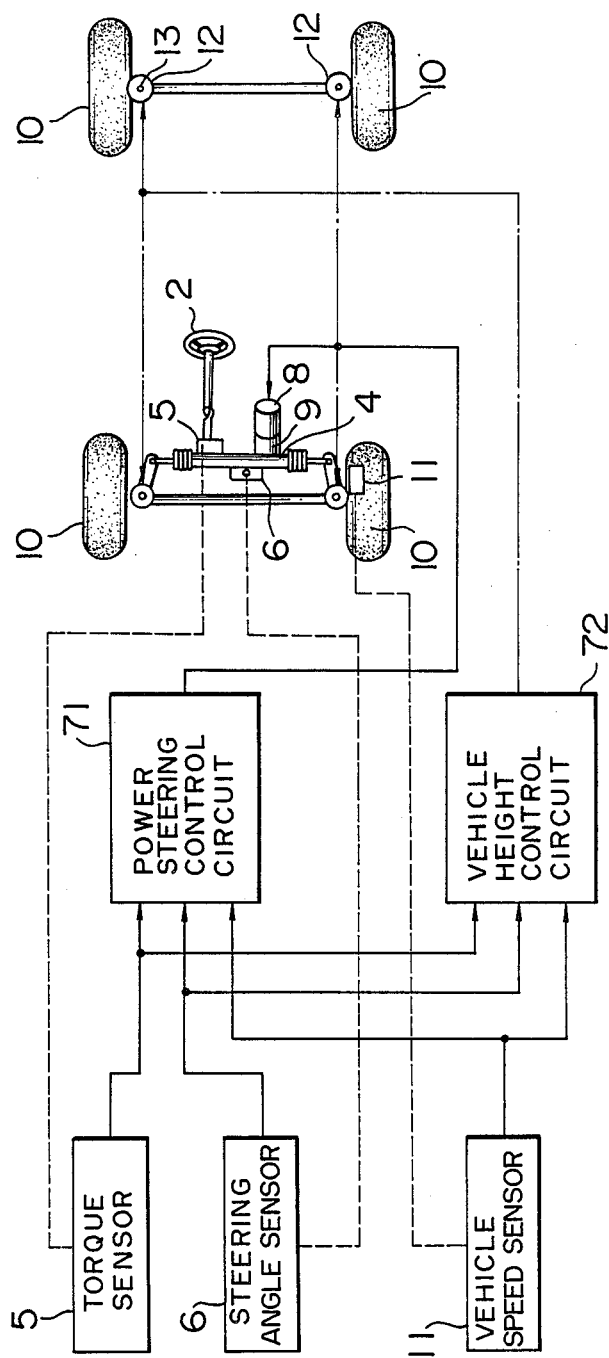
FIG. 1 is a system diagram showing a vehicle height control apparatus responsive to power steering operation according to an embodiment of the invention.
Figure 2:
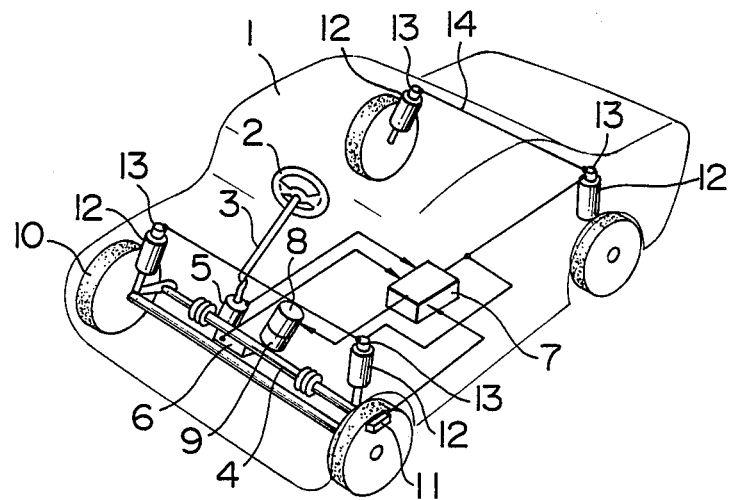
FIG. 2 is a schematic diagram showing the arrangement of the components in an embodiment of the invention.
Figure 3:
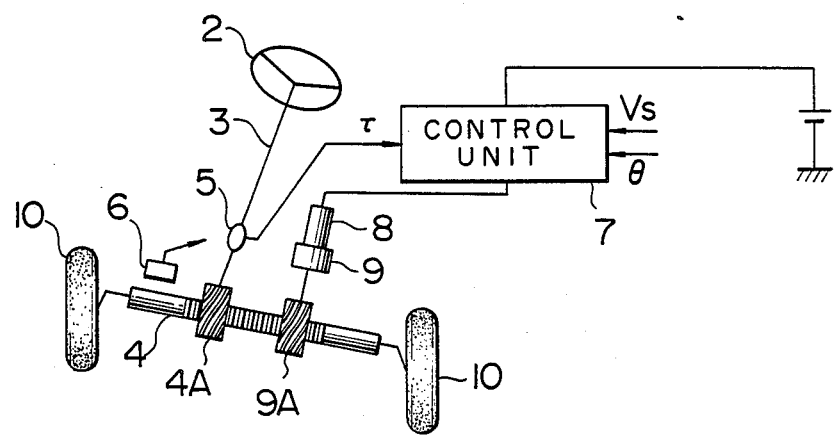
FIG. 3 is a schematic diagram of the steering mechanism in FIG. 2.

FIG. 1 shows a specific embodiment of the invention. FIG. 2 illustrates a schematic diagram of an automotive vehicle to which the invention is applied. In FIGS. 2 and 3, numeral 1 designates an automotive vehicle having a steering wheel 2 connected through a shaft 3 to a steering mechanism including a rack 4, a pinion gear 4A, etc. A torque sensor 5 is mounted at the forward end of the steering shaft 3 to detect its twisting torque. Also, a steering angle sensor 6 is provided near the rack gear to detect the moving angle of the front wheels 10 in accordance with the amount of movement of the rack gear.

This embodiment is of the so-called rack-and-pinion type so that the steering force imparted to the steering wheel 2 by the driver is applied to the pinion gear 4A from the shaft 3 through the torque sensor 5 which in turn detects the resulting steering torque to generate a signal $\tau$ indicative of the magnitude of the torque. The torque sensor 5 produces an electric output signal obtained by converting the twist angle of the steering shaft into an electric signal by using, for example, a variable resistor. An electric motor 8 operates as an electrically-operated actuator which imparts an assisting steering force to the rack 4 through a reduction gear such as a gearing and a pinion 9A. The steering angle sensor 6 includes, for example, a linear encoder to produce an output signal indicative of the steering angle of the front wheels 10 of the vehicle.

For instance, a linear encoder or the like is attached to the rack or the like. The electric motor 8 used with this power steering system may be comprised of a DC motor, brushless DC motor or induction motor. A control unit 7 for controlling the torque and speed of the motor 8 is so constructed that the applied voltage or current flow to the motor 8 is controlled in accordance with the vehicle speed vs, the torque $\tau$ and the steering angle $\theta$.

The other component parts related to the vehicle height control will now be described. Numeral 12 designates shock absorbers of the suspension systems and the four shock absorbers 12 are provided in correspondence to the number of the tires 10. Also, formed integral with the upper part of each shock absorber 12 is an actuator 13 comprising a motor or the like for varying the damping constant of the shock absorber. Each of the actuators 13 is separately controlled by the control unit 7 through a power signal line 14.

Figure 4:
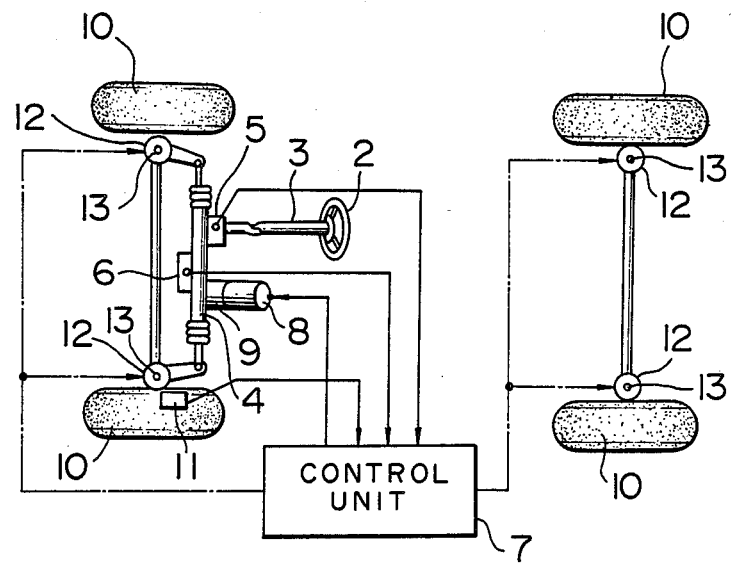
FIG. 4 is a circuit diagram of the apparatus shown in FIG. 2.

Referring to FIG. 4 for explaining the flow of the control signals, when the signals from the torque sensor, the steering angle sensor and the vehicle speed sensor, shown by the solid lines, are applied to the control unit 7, the electrically-operated power steering motor driving signals and the vehicle height control shock absorber actuator driving signals (the dot-and-dash lines) are respectively detected and the motor 8 and the actuators 13 are controlled as occasions demand.

Figure 6:
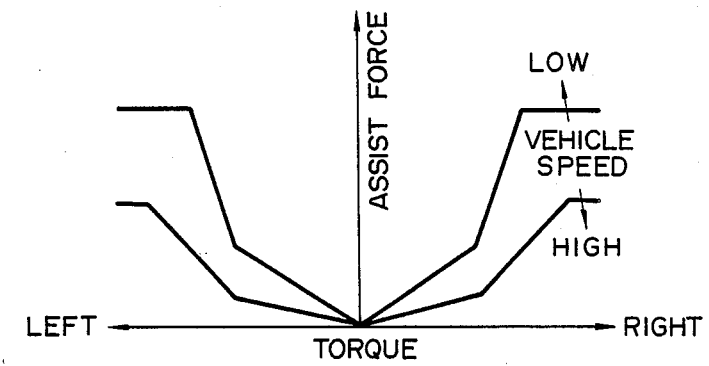
FIG. 6 is a characteristic diagram showing the relation between the steering torque and the assisting force for explaining the operation of the invention.
Figure 5:
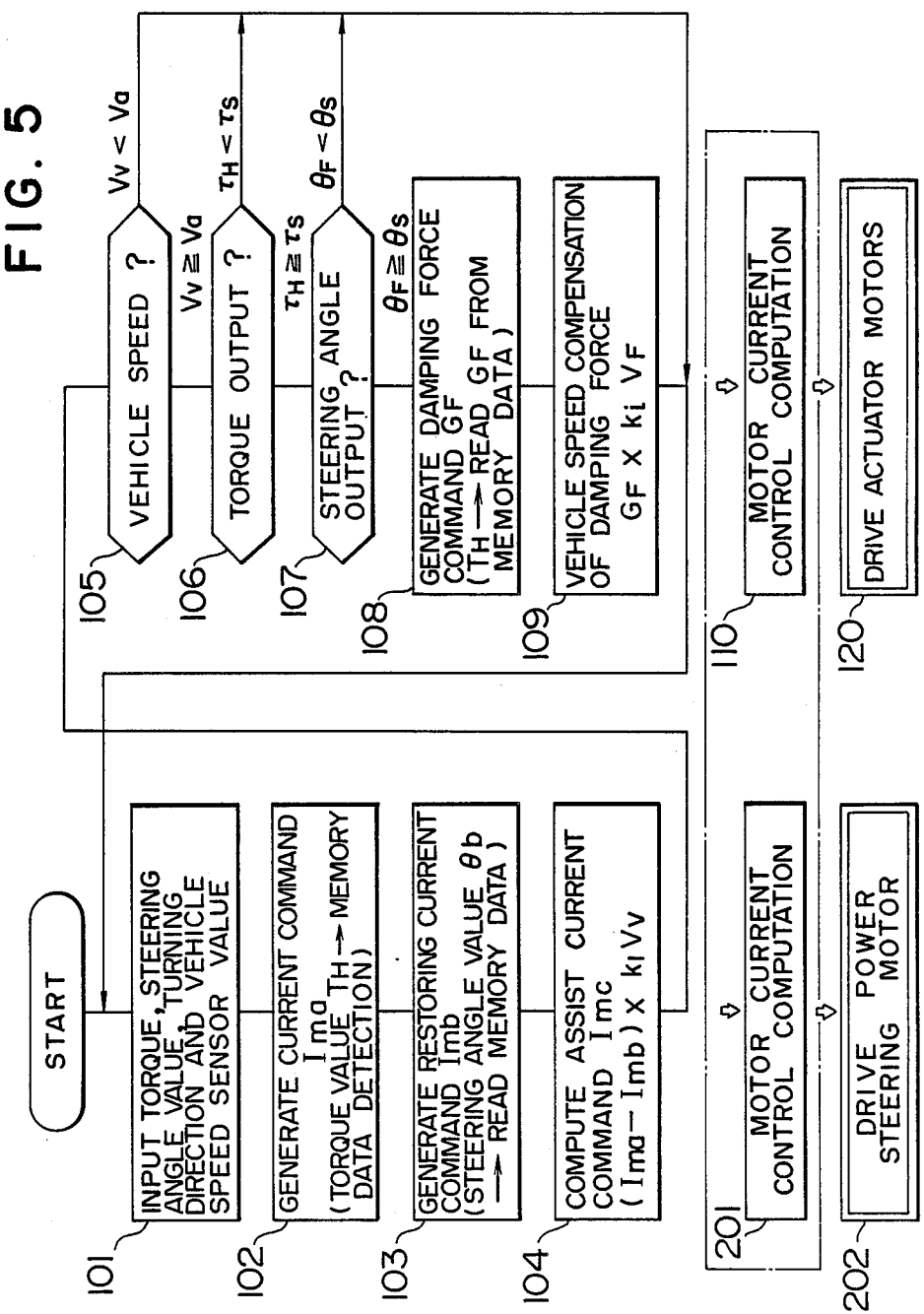
FIG. 5 is a control flow chart for the embodiment of the invention.
Figure 7A:
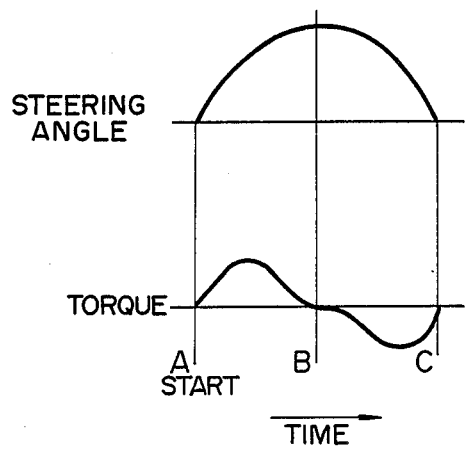
FIGS. 7A and 7B are characteristic diagrams showing steering torque output waveforms with respect to steering angle output waveforms.
Figure 7B:
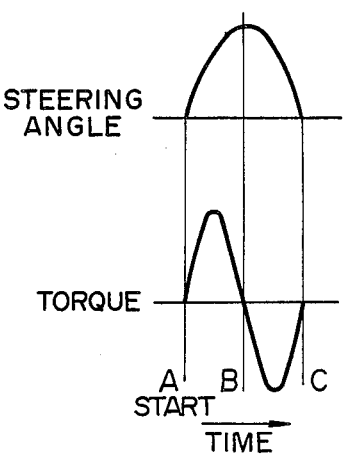
Figure 8:
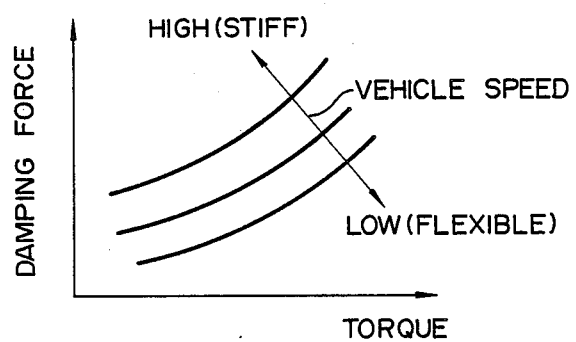
FIG. 8 is a shock absorber damping force control characteristic diagram.

Referring again to FIG. 1, the specific embodiment of the invention will be described. The description will now be made with reference to FIG. 1 showing the control circuit block diagram, FIG. 5 showing the control flow chart, FIG. 6 showing the electrically-operated power steering control characteristics, FIGS. 7A and 7B showing the wheel steering angle versus torque characteristics for the vehicle height control and FIG. 8 showing the damping force control characteristics shown.

The control unit 7 shown in FIG. 4 includes a power steering control circuit 71 and a vehicle height control circuit 72 as shown in FIG. 1.

The operation of the power steering control circuit 72 will be described first.

In FIG. 1, when the steering wheel 2 is turned to the right, a torque corresponding to the steering effort of the steering wheel is generated from the torque sensor 5 and applied to the power steering control circuit 71 and the vehicle height control circuit 72, respectively. Also, similarly in response to the turning of the steering wheel 2 the change in the position of the rack pinion gear 4A, that is, the steering angle is detected by the steering angle sensor 6, and also the vehicle speed of the vehicle is detected by the vehicle speed sensor 11, thereby applying the resulting signals to the control circuits. The control operations corresponding in terms of software to these signals are as shown by the flow chart of FIG. 5. As shown in FIG. 5, at a step 101, the torque and the steering angle values are inputted and the turning direction of the steering is determined based on whether the steering angle value is increased or decreased as compared with its value obtained when the steering is positioned at neutral. Then, the vehicle speed value is also inputted. Next, at a step 102, the data of a current command value $I_{ma}$, which is a given function of the torque value $T_H$, is read from the table area of an ROM by the table look-up method in accordance with the torque value $T_H$ inputted at the step 101. At a step 103, similarly a restoring command value $I_{mb}$, which is a given function of the steering angle value $\theta_b$, is read from the ROM in accordance with the inputted steering angle value $\theta_b$. At a step 104, in accordance with the current command value $I_{ma}$, the restoring current command value $I_{mb}$ and the vehicle speed $V_v$ the following calculation is performed to determine a steering assist current command value $I_{mc}$ $$I_{mc} = (I_{ma} - I_{mb}) \cdot k_1 \cdot V_v \tag{1}$$

where $k_1$ is a value variable depending on the vehicle speed and read out of the table of the ROM according to the inputted vehicle speed value $V_v$.

Then, while the software processing is transferred to the vehicle height control at a step 105, the operation of the power steering system is effected in such a manner that in accordance with the current command value $I_{mc}$ determined at the step 104, the motor is controlled to attain the assist force characteristic shown in FIG. 6 by use of a power steering motor drive circuit at a step 202 through the performance of a motor current control computation at a step 201 executed for example by hardware. In other words, the assist force is increased with increase in the torque and also the assist force is increased with decrease in the vehicle speed, thereby simplifying the operation of the steering wheel and making the system become the vehicle responsive type.

On the other hand, the effect of the restoring current command value $I_{mb}$ at the step 104 is such that if, for example, the steering wheel is turned to generate a steering torque and then the driver takes his hands off the steering wheel while rotating the motor clockwise, the torque is reduced to zero. At this time, the current $I_{mb}$ is supplied in the opposite direction to rotate the motor counterclockwise and thereby to facilitate the restoration of the steering wheel when the driver takes his hands off it. It is to be noted that the motor current control computation at the step 201 may be processed by hardware using an operation amplifier or software.

The vehicle height control will now be described. While a method of utilizing the steering angle as a control command for the vehicle height control may be conceivable, the use of the steering torque as a control command makes it possible to make the control response faster. FIGS. 7A and 7B show variation of the steering angle and the torque when the steering operation starts at a time "A" to turn the steering in one direction during a time interval "A" to "B" and return the steering to its neutral position during a time interval "B" to "C". In case of FIG. 7A, the torque takes the form of the differentiated value with respect to the steering angle and therefore the torque output varies considerably when the steering wheel is turned. On the other hand, since the steering torque is reduced to zero when the steering wheel is stopped turning and it becomes the reverse torque when the steering wheel is returned, it is possible to speed up the response of the damping force of the shock absorbers. In other words, when the steering wheel is turned as the vehicle comes to a corner during its running, a steering torque is generated so that the damping force of the absorbers is increased rapidly and the outward diving of the vehicle body is reduced. Then, when the cornering is completed so that the steering wheel is returned, the steering torque is immediately reduced to zero so that when it eventually becomes the reverse torque, then the damping force of the shock absorbers is rapidly decreased and the damping force is restored, thereby improving the stability of the vehicle body. On the other hand, where the curve is sharp, the rate of change of the steering angle is so high that the torque signal is increased as shown in FIG. 7B and the damping force control of the shock absorbers follows rapidly, thereby improving the response. In other words, the control operation is performed so that sharper the curve is, the control command is more rapidly and greatly generated so as to correct the diving of the vehicle body.

Referring again to FIG. 5, the software processing proceeds as follows. At the step 105, the vehicle speed $V_v$ is compared with a vehicle speed $V_a$ at which the vehicle height control must be effected so that if $V_v < V_a$, the vehicle height control is not performed and a return is made to the step 101. If the vehicle speed is $V_v \geq V_a$, the steering torque output is checked at a step 106. If the torque output $T_H$ is less than a small torque value $T_S$, a return is made to the step 101. If $T_H \geq T_S$, the steering angle output is checked at a step 107. If the steering angle output $\theta_F$ less than a small steering angle value $\theta_S$, a return is made to the step 101 and the vehicle height control is not performed. If $\theta_F \geq \theta_S$, a damping force control command $G_F$ is read from the ROM as a function of the magnitude of the torque command $T_H$ as shown in FIG. 8 at a step 108. Then, at a step 109, the vehicle speed correction of the damping force control command value according to the following equation is performed $$G_{Fc} = G_{Ft} \times k_2 \times V_v \qquad (2)$$

In other words, as shown in FIG. 8, the control operation is performed such that the damping force control command value $G_{Fc}$ is increased with increase in the torque command and it is also varied according to the vehicle speed. While the software processing is returned to the step 101, the motor current control computation of a step 110 is such that the current control computation is effected in accordance with the damping force control command value $G_{Fc}$ and the actuator motors 13 shown in FIG. 1 are operated through an acutator motor drive circuit at a step 120, thereby varying the damping force of the shock absorbers 12.

The following Table 1 shows an example of the feature of the above-mentioned method.

TABLE 1

| | Command signal | | Prior art (steering angle detection) | Invention (torque detection) | Steering wheel turning condition |
|---|---|---|---|---|---|
| | Torque | Steering angle | Shock absorber | | |
| 1 | Large | Large | Stiff | Stiff | Normal turning |
| 2 | Large | Small | Flexible | Stiff | Rapid turning |

The Table shows the conventional method of the steering angle detection type and the torque detection-type command method according to the invention. In the normal wheel turning condition, if the torque and the steering angle resulting from the turning of the steering wheel are large, the two methods likely stiffen the shock absorbers to reduce the diving of the vehicle body. During the rapid turning period where the steering angle of the steering wheel is relatively small, in the case of the conventional method the shock absorbers are left in the flexible condition due to the steering angle being small, whereas in accordance with the invention the shock absorbers are stiffened and the diving of the vehicle body is reduced.

In accordance with the invention, the torque sensor, the steering angle sensor and the vehicle speed sensor, used for the purpose of electrically-operated power steering, are concurrently used with the vehicle height control apparatus with the resulting simplification of the system construction.

Further, due to the use of the torque signal for the vehicle height control, it is possible to speed up the response in varying the damping force of the shock absorbers as compared with the steering angle type, thus slowing the diving and speeding up the restoration during the cornering of the vehicle body and thereby improving the steering performance. Also, the cost of the sensors is low as compared with the vehicle height control employing an expensive G sensor.

Still further, with the electrically-operated power steering, when the driver takes his hands off the steering wheel, its restoration control is effected in accordance with the torque and the steering angle sensor signal and thus the torque is restored faster, thereby quickly restoring the incline of the vehicle body after the completion of the cornering during the vehicle height control. Still further, in accordance with the steering wheel torque command method, sharper the curve is, greater the damping force of the shock absorbers becomes for the same vehicle speed with the resulting effect of reducing the diving of the vehicle body and so on.

We claim:

1. A vehicle height control apparatus responsive to power steering operation comprising:
   a steering mechanism for turning front wheels by operating a steering wheel through a reduction gear;
   a steering torque sensor for detecting a twisting torque of said steering wheel;
   a motor for receiving a signal from said torque sensor to assist said steering mechanism;
   a control unit responsive to said torque sensor signal to control said motor;
   a power source for supplying power to said control unit;
   a vehicle speed sensor for detecting a vehicle speed;
   suspension actuator means operative to control a vehicle height; and
   control means responsive to a signal from said torque sensor generated by operation of said steering wheel to operate said suspension actuator means.

2. An apparatus according to claim 1, wherein said suspension actuator means includes means for selectively varying damping forces of shock absorbers provided to respective suspensions of the vehicle, and the damping forces of said shock absorbers on left and right sides are selectively varied by the signal from said torque sensor.

3. An apparatus according to claim 1, wherein said torque sensor generates a power steering control signal and a vehicle height control signal.

4. A vehicle height control apparatus comprising: responsive to power steering operation comprising:
   means for receiving a steering torque value, steering angle value and turning direction of a steering wheel and a vehicle speed value as input values to generate a motor current command value in accordance with said steering torque value;
   computing means responsive to said steering angle value for generating a restarting motor current command value with respect to said motor current command value;
   computing means for determining a difference between said two motor current command values;
   means for correcting said determined difference value in accordance with said vehicle speed value;
   means for preventing a vehicle height control when said vehicle speed, steering torque and steering angle output values are respectively less than predetermined values and for controlling damping force of shock absorbers in accordance with said steering torque value when said output values are respectively greater than said predetermined values; and
   means for correcting said damping force in accordance with said vehicle speed value;
   whereby the vehicle height is controlled in accordance with steering wheel steering torque, steering angle and vehicle speed values.

5. An apparatus according to claim 4, wherein said motor current command value corresponding to said steering torque value is read from a table area of predetermined stored values.

6. An apparatus according to claim 4, wherein a damping force controlling motor current value is read from a predetermined table area.

* * * * *